United States Patent
Leveen

(12) 
(10) Patent No.: US 12,264,620 B2
(45) Date of Patent: Apr. 1, 2025

(54) ATTENUATED COMBUSTION FOR CLEAN POWER AND HYDROGEN CAPTURE

(71) Applicant: Nucor Corporation, Charlotte, NC (US)

(72) Inventor: Lindsay Leveen, Sausalito, CA (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

(21) Appl. No.: 18/646,753

(22) Filed: Apr. 25, 2024

(65) Prior Publication Data

US 2024/0360785 A1    Oct. 31, 2024

Related U.S. Application Data

(60) Provisional application No. 63/461,890, filed on Apr. 25, 2023.

(51) Int. Cl.
| | |
|---|---|
| F02C 3/22 | (2006.01) |
| F02C 1/08 | (2006.01) |
| F02C 6/10 | (2006.01) |
| F23R 3/28 | (2006.01) |
| B01D 53/02 | (2006.01) |

(52) U.S. Cl.
CPC ............ *F02C 3/22* (2013.01); *F02C 1/08* (2013.01); *F02C 6/10* (2013.01); *F23R 3/28* (2013.01); *B01D 53/02* (2013.01); *B01D 2256/16* (2013.01); *B01D 2257/502* (2013.01); *B01D 2258/02* (2013.01); *F05D 2220/64* (2013.01)

(58) Field of Classification Search
CPC ...... F02C 1/08; F02C 1/10; F02C 3/20; F02C 3/22; F02C 3/34; F02C 6/10; F02C 6/18; B01D 2257/502; B01D 2257/504
See application file for complete search history.

(56) References Cited

U.S. PATENT DOCUMENTS

| | | | |
|---|---|---|---|
| 6,877,322 B2 * | 4/2005 | Fan ............... | F01K 23/068 60/39.12 |
| 7,066,984 B2 * | 6/2006 | Dunn ............... | C01B 3/52 95/92 |
| 7,988,948 B2 * | 8/2011 | Guvelioglu ........ | C01B 3/48 423/652 |
| 8,137,422 B2 * | 3/2012 | Licht .............. | C01B 3/382 423/655 |

(Continued)

FOREIGN PATENT DOCUMENTS

| | | |
|---|---|---|
| EP | 2233430 A1 | 9/2010 |
| WO | 2021250083 A1 | 12/2021 |

OTHER PUBLICATIONS

Wagman, David; "This Power Plant Runs on CO2," Spectrum IEEE, 2018, 17 Pages—https://spectrum.ieee.org/this-power-plant-runs-on-co2.

(Continued)

*Primary Examiner* — Alain Chau

(74) *Attorney, Agent, or Firm* — Christopher J. Knors; Moore & Van Allen PLLC

(57) ABSTRACT

Systems and systems to generate clean energy and for providing hydrogen capture and carbon capture sequestration are provided. Hydrogen from partial combustion of hydrocarbon fuel in combination with full combustion of carbon from hydrocarbon fuel is used to generate clean power with hydrogen capture and carbon capture sequestration.

7 Claims, 2 Drawing Sheets

(56) References Cited

U.S. PATENT DOCUMENTS

| | | | | |
|---|---|---|---|---|
| 8,776,532 | B2* | 7/2014 | Allam | F25J 3/04563 |
| | | | | 60/39.464 |
| 10,180,253 | B2* | 1/2019 | Lee | F23L 7/007 |
| 11,859,517 | B2* | 1/2024 | Lu | F02C 1/08 |
| 2004/0123601 | A1* | 7/2004 | Fan | F01K 23/068 |
| | | | | 60/39.12 |
| 2005/0066813 | A1* | 3/2005 | Dunn | F25J 3/0223 |
| | | | | 95/116 |
| 2015/0308676 | A1* | 10/2015 | Lee | B01D 53/62 |
| | | | | 431/121 |
| 2018/0128172 | A1* | 5/2018 | Allam | C10K 3/04 |
| 2019/0211715 | A1* | 7/2019 | Park | C01B 3/02 |
| 2020/0276535 | A1* | 9/2020 | Callahan | F02C 3/22 |
| 2021/0115848 | A1* | 4/2021 | Callahan | B01D 53/047 |
| 2022/0099003 | A1* | 3/2022 | Lu | F01K 25/103 |
| 2023/0219816 | A1 | 7/2023 | Goswami et al. | |
| 2023/0340914 | A1* | 10/2023 | Callahan | F02C 3/22 |

OTHER PUBLICATIONS

European Patent Office; International Search Report & Written Opinion for International Patent Application No. PCT/US2024/026283 dated Sep. 11, 2024, 14 Pages.

\* cited by examiner

ATTENUATED COMBUSTION FOR CLEAN POWER AND HYDROGEN CAPTURE

CROSS-REFERENCE TO RELATED APPLICATION

This application claims the benefit of priority to U.S. Provisional Patent Application No. 63/461,890, filed on Apr. 25, 2023, the content of which is incorporated herein by reference in its entirety for all purposes.

TECHNICAL FIELD

This disclosure is directed to methods and systems to generate clean energy and for providing hydrogen capture and carbon capture sequestration. In one example, hydrogen from partial combustion of hydrocarbon fuel in combination with full combustion of carbon from hydrocarbon fuel is used to generate power.

BACKGROUND

Nearly all fossil fuel-burning power plants globally release at least a portion of their carbon emissions directly into the atmosphere. In some advances in this field, combusted natural gas emissions are captured and concentrated for carbon capture sequestering (CCS). In previous attempts the economics of CCS have been unsuccessful in balancing power cycles with the expensive of efficiency-reducing equipment to carry out CCS.

The Allam-Fetvedt Cycle uses oxygen combustion of carbon fuels and a high-pressure supercritical $CO_2$ working fluid in a recuperated cycle with CCS and may provide higher efficiencies at low costs with reduced or eliminated water consumption.

Nonetheless, the above power generating processes exploit the full combustion/oxidation of the carbon-based/hydrocarbon fuel, essentially using an equal or excess stochiometric amount of oxygen to oxidize the hydrocarbon to carbon dioxide ($CO_2$) and water without the intentional generation and capture of valuable hydrogen ($H_2$).

SUMMARY

In one example, a method for generating clean energy is provided, the method comprising: partially combusting a hydrocarbon fuel and providing a combustion gas stream, the combustion gas stream comprising hydrogen and carbon monoxide (CO); completely combusting at least a portion of the CO and providing a source of carbon dioxide ($CO_2$) working fluid; and using said source of $CO_2$ working fluid to generate clean energy.

In one aspect, the method is partially closed loop or closed loop.

In one aspect, alone or in combination with any one of the previous aspects, the method further comprises at least partially separating the CO from the hydrogen. In one aspect, alone or in combination with any one of the previous aspects, the method further comprises at least partially capturing the hydrogen.

In one aspect, alone or in combination with any one of the previous aspects, the method further comprises at least partially separating the CO from gases present in the combustion gas stream.

In one aspect, alone or in combination with any one of the previous aspects, the method further comprises compressing, heating, and then expanding the source of $CO_2$ working fluid. The method of claim, wherein the source of $CO_2$ working fluid is a liquid, a gas, in a supercritical state, or combination. In one aspect, alone or in combination with any one of the previous aspects, the method further comprises coupling the source of $CO_2$ working to at least one turbine.

In another example, a system for generating clean energy is provided, the system comprising: in a partial combustor, partially combusting a hydrocarbon fuel and providing a combustion gas stream comprising an amount of hydrogen and an amount of carbon monoxide (CO) therefrom; in a oxy-combustor, completely combusting at least a portion of the amount of CO and providing a carbon dioxide ($CO_2$) working fluid; and using said $CO_2$ working fluid to generate clean energy.

The system of claim, wherein the system is partially closed loop or closed loop.

In one aspect, alone or in combination with any one of the previous aspects, the system further comprises an air separating unit, wherein the air separating unit is coupled to one or both of the partial combustor and oxy-combustor.

In one aspect, alone or in combination with any one of the previous aspects, the system further comprises a separator unit, wherein the amount of CO is at least partially separated from the amount of hydrogen in the separator unit.

In one aspect, alone or in combination with any one of the previous aspects, the system further comprises a CO separator unit wherein the amount of CO is further separated from $CO_2$ present in the combustion gas stream.

In one aspect, alone or in combination with any one of the previous aspects, the $CO_2$ working fluid is provided as a liquid, gas, in a supercritical state, or combination.

In one aspect, alone or in combination with any one of the previous aspects, the system further comprises at least one compressor for receiving and compressing the $CO_2$ working fluid.

In one aspect, alone or in combination with any one of the previous aspects, the system further comprises at least one heat exchanger coupled to the combustion gas stream for heating the $CO_2$ working fluid.

In one aspect, alone or in combination with any one of the previous aspects, the system further comprises at least one expander unit for receiving and expanding the source of $CO_2$ working fluid.

In one aspect, alone or in combination with any one of the previous aspects, the system further comprises at least one turbine coupled to the expander unit.

The system of claim, further comprising at least one at least on carbon capture sequestration (CCS) unit coupled to the expander unit.

In another example, a method of generating power is provided, the method comprising the steps of: i) partially combusting a hydrocarbon fuel and $O_2$ (oxygen) to provide a partially combusted product stream comprising $H_2$ (hydrogen), CO (carbon monoxide), water with trace amounts of $CO_2$ (carbon dioxide); ii) separating the $H_2$ from the partially combusted product stream; iii) separating the CO from the partially combusted product stream; iv) oxidizing the CO from step iii) and providing a rich $CO_2$ stream; v) compressing the rich $CO_2$ stream and providing a compressed $CO_2$ stream; vi) elevating a temperature and a pressure of the compressed $CO_2$ stream, and providing a high pressure, high temperature $CO_2$ stream; vii) expanding the high pressure, high temperature $CO_2$ stream and providing a $CO_2$ working fluid; viii) coupling the $CO_2$ working fluid to an energy generating device; and ix) generating power.

In one aspect, the method is partially closed loop or closed loop.

In one aspect, alone or in combination with any one of the previous aspects, the hydrocarbon fuel is natural gas.

In one aspect, alone or in combination with any one of the previous aspects, the method further comprises capturing and/or storing the H2 from step ii.

In one aspect, alone or in combination with any one of the previous aspects, the partially combusted product stream is presented to at least one heat exchanger. In one aspect, alone or in combination with any one of the previous aspects, step vi) comprises heat exchanging between the partially combusted product stream and the compressed CO2 stream.

In one aspect, alone or in combination with any one of the previous aspects, step ii) and step iii) are concurrent.

In one aspect, alone or in combination with any one of the previous aspects, the method further comprises coupling step vii) with step v).

In one aspect, alone or in combination with any one of the previous aspects, step iv comprises an oxy-combustion process. In one aspect, alone or in combination with any one of the previous aspects, the oxy-combustion process is coupled with an air separator providing a source of essentially pure oxygen.

In one aspect, alone or in combination with any one of the previous aspects, the CO2 working fluid of step viii is coupled to at least one turbine. In one aspect, alone or in combination with any one of the previous aspects, the method further comprises sequestering at least a portion of the rich CO2 stream, the CO2 working fluid, or both. In one aspect, alone or in combination with any one of the previous aspects, the CO2 working fluid of step viii is in a gaseous state, a liquid state, a supercritical state, or combination thereof.

BRIEF DESCRIPTION OF THE DRAWINGS

In order to understand and to visualize how the present disclosure may be carried out in practice, examples will now be described, by way of non-limiting examples only, with reference to the accompanying drawings, in which.

DETAILED DESCRIPTION

Figure 1:
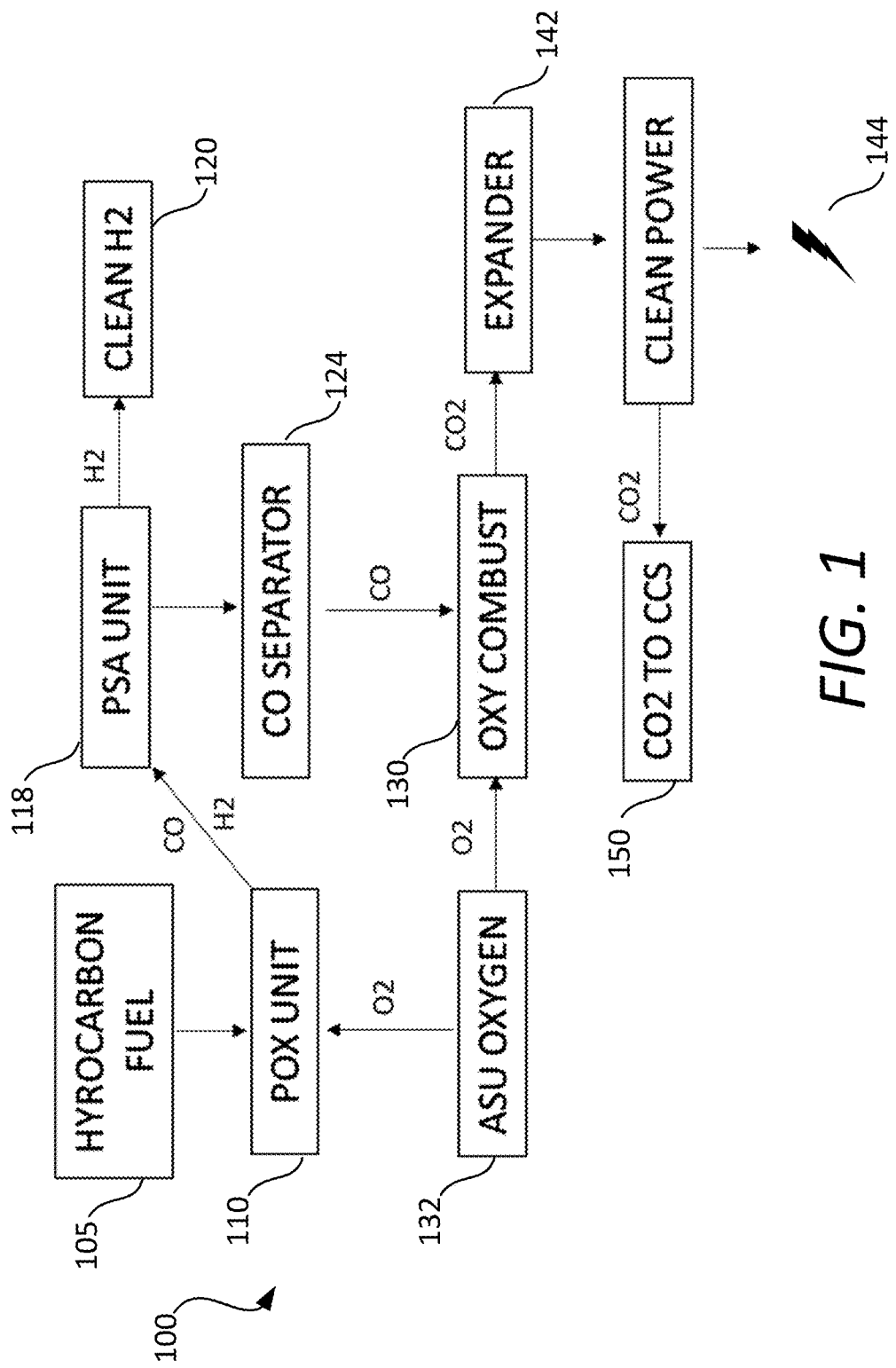
FIG. 1 is a schematic flow diagram of the presently disclosed method and system.

As used herein, the phrase "essentially pure," or "essentially free" are inclusive of at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, at least 99.5%, at least 99.9% free of other substances. In one example, "essentially pure," or "essentially free" is at least 95%, at least 96%, at least 97%, at least 98%, at least 99%, at least 99.5%, at least 99.9% free of other substances.

As used herein, the phrase "clean energy" is inclusive of methods and systems that reduce or substantially eliminate emission of carbon sources while producing energy while consuming a fuel. For example, reducing or eliminating sources of carbon dioxide emissions from energy production facilities, such as those that consume hydrocarbon fuels.

As used herein, the term "rich" is inclusive of essentially pure or high concentrated relative to other material present. For example, a rich CO2 stream is one that is essentially 95, 96, 97, 98, 99 or greater in purity, as measured in parts per million, moles, or weight percent.

As used herein, the term "combustion" is inclusive of its ordinary and customary meaning, for example, a chemical combination of a substance with oxygen, typically involving a production of heat.

As used herein, the phrase "partial combustion" is inclusive of its ordinary and customary meaning, for example, an incomplete or non-stochiometric chemical combination of a substance with its molar equivalent of oxygen, for example, processes that use of oxygen and/or air, and combined, in less than stoichiometric amount, with a hydrocarbon or carbon-based fuel, so as to provide a reaction stream of partially oxidized hydrocarbon reaction products where the hydrogen present in the hydrocarbon is not completely oxidized to water and the carbon present in the hydrocarbon fuel is not completely oxidized to carbon dioxide. For example, partial combustion of a hydrocarbon fuel provides a partial combustion stream including, for example, carbon monoxide, hydrogen, water and carbon dioxide.

As used herein, the phrase "POX unit" is inclusive of its ordinary and customary meaning, for example, equipment or systems for carrying out partial combustion of a fuel, for example, a hydrocarbon fuel.

As used herein, the phrases "oxy-fuel combustion," and "oxy-combustion" are inclusive of its ordinary and customary meaning, for example, processes that use a pure source of oxygen and/or air stripped of other gases so as to be essentially pure oxygen, and combined, in an equal or stoichiometric excess, with a hydrocarbon or carbon-based fuel, so as to provide a reaction stream of essentially pure carbon dioxide (CO2) along with water.

As used herein, the phrase "oxy-combustor" is inclusive of its ordinary and customary meaning, for example, equipment or a system capable of performing oxy-combustion, for example, of a hydrocarbon fuel.

As used herein, the phrase "carbon capture sequestration (CCS)" is inclusive of its ordinary and customary meaning, for example, equipment or a system capable of geological or biological sequestering carbon dioxide or continuous chemical conversion of carbon dioxide to non-greenhouse gases or products.

As used herein, the phrased "high pressure," or "high temperature" are inclusive of its ordinary and customary meaning, for example, pressures or temperatures above ambient by an order of magnitude including 2×, 10×, 100× or more above ambient temperature or pressure. In one example, "high pressure," or "high temperature" is ordinary and customary thermodynamic temperatures and pressures typically associated with the partial combustion or complete combustion of hydrocarbon fuels or carbon monoxide with oxygen.

Presently disclosed systems and systems generate clean energy and provide hydrogen capture and carbon capture sequestration from the partial combustion of hydrocarbon fuel in combination with full combustion of carbon from the hydrocarbon fuel. At least part of the oxidized carbon from the hydrocarbon fuel is used to generate clean power.

In the presently disclosed method and system, approximately 20% or less of the hydrogen present in a hydrocarbon fuel is oxidized, providing for about 80% of the hydrogen from the hydrocarbon fuel to be captured and/or sold. The presently disclosed method and system will require about 40% less oxygen, thus, reducing costs with less heat and reduced overall electricity output for a given volume of hydrocarbon fuel. However, this less heat and reduced overall electricity output is offset by economic value realized from clean hydrogen tax credits and market demand. In one example, the presently disclosed method and system will result in less than about 10% of the hydrogen in the hydrocarbon fuel will be oxidized. and In one example, the presently disclosed method and system will result in less than about 20% of hydrogen in the hydrocarbon fuel will be oxidized. In one example, the presently disclosed method and system will result in 15 to 16% hydrogen oxidation in the hydrocarbon fuel.

In one example, the presently disclosed method and system will result in essentially all the carbon in the hydrocarbon fuel is fully oxidized and results in stochiometric amounts of $CO_2$ that is then compressed, dried, and transported and/or sequestered.

In one example, the presently disclosed method and system will result in about 50-80% of the energy out in hydrogen and about 20-40% in electricity. In one example, the presently disclosed method and system will result in 60-70% of the energy out is in hydrogen and 25-35% is in electric power. The presently disclosed method and system provides for a greater fraction of the energy out of the system in hydrogen rather than in the electric power on a BTU basis. In one example, the presently disclosed method and system will result in as much as 80 percent of all the energy out in hydrogen on a BTU basis. In one example, the presently disclosed method and system will result in an equal amount of energy in hydrogen and electric power.

In one example, as the amount of oxygen combined with the natural gas in the partial oxidation unit is below a stoichiometric amount, essentially all of the carbon present in the natural gas entering the partial oxidation unit is converted to CO. In one example, essentially all of the carbon present in the natural gas entering the partial oxidation unit is converted to CO with less than 10 mole % carbon dioxide produced, less than 5 mole % carbon dioxide produced, less than 3 mole % carbon dioxide produced, or less than 1 mole % carbon dioxide produced.

In one example, as the amount of oxygen combined with the natural gas introduced to the partial oxidation unit is below a stoichiometric amount of that of the hydrocarbon fuel, e.g. natural gas, a large portion of the hydrogen present in the natural gas entering the partial oxidation unit is converted to hydrogen rather than water, as would otherwise be the case with complete oxidation of the natural gas. Under these non-stoichiometric conditions, approximately 70-90 mole percent, or about 75-85 mole percent, or about 80 mole percent of the hydrogen present in the natural gas is converted to hydrogen, with the remainder of the hydrogen from the natural gas being present in water.

Thus, the partially combusted product stream leaving the partial oxidation unit of the presently disclosed method is comprised of carbon monoxide, hydrogen, water, and trace amounts of carbon dioxide. In one aspect, the present disclosure provides for the collection and/or storage of this hydrogen that is derived from the hydrocarbon fuel stream introduced into the partial oxidation unit. The present disclosure further provides for the collection and/or storage of essentially pure hydrogen that is derived from the hydrocarbon fuel stream introduced into the partial oxidation unit by subsequently separating the hydrogen from carbon monoxide, and water in the partially combusted product stream. Essentially pure hydrogen is inclusive of hydrogen that is 95 wt. %, 96 wt. %, 97 wt. %, 98 wt. %, 99 wt. %, 99.5 wt. % or greater in purity.

The present disclosure further provides for the collection and/or storage of essentially pure hydrogen that is derived from the natural gas fuel stream introduced into the partial oxidation unit and subsequently separated from carbon monoxide and water in the partially combusted product stream.

A heat and mass balance of the presently disclosed method and system indicates that the method and system will generate more power than is needed for the air separation unit (ASU) 123 to make the oxygen used in the POX unit 110, 220, plus the power needed in the compressor 217 used to recover clean hydrogen 110, 220, and the power needed in the $CO_2$ compressor 236 for the power recovery system and the $CO_2$ sequestration. The hydrogen generated by the presently disclosed method and system will be clean and without $CO_2$ emissions. The net power generated and sold by the presently disclosed method and system will be clean with no $CO_2$ emissions. Also, the nitrogen and argon produced in the ASU by the presently disclosed method and system will be without $CO_2$ emissions and can also be sold.

In one example, any separated nitrogen from separator 232 can be combined with the captured hydrogen 220 to produce clean ammonia.

In one example, the methods and system can comprise passing the $CO_2$ working fluid through one or more compressors (e.g., pumps) to pressurize the $CO_2$ working fluid to a pressure of at least about 8 MPa or 80 bar g. This further may comprise passing the $CO_2$ working fluid through a series of at least two compressors to pressurize the $CO_2$ circulating fluid stream. In certain embodiments, the $CO_2$ working fluid can be pressurized to a pressure of at least about 15 MPa or 150 bar g. Even further pressure ranges may be desirable, as otherwise described herein. In other examples, the pressurized $CO_2$ working fluid specifically can be provided in a supercritical fluid state. In some examples, at least a portion of the $CO_2$ in the pressurized $CO_2$ working fluid can be introduced into a pressurized pipeline for sequestration (or other disposal, as discussed herein).

Expanding a supercritical $CO_2$ stream purified of combustion products and recycled $CO_2$ rich fluid as presently disclosed in a turbine with production of shaft power, can be performed by expanding to a pressure that is above about 2 MPa or 20 bar g, and is below the pressure at which a $CO_2$ liquid phase appears. In one example the fluid is cooled to a temperature near ambient temperature to about 7-8 MPa or 70-80 bar g.

The clean power generation systems 100, 200 according to the present disclosure uses a working fluid comprising essentially $CO_2$. In other words, the chemical nature of the working fluid immediately prior to input into the energy generating device is such that the working fluid comprises essentially $CO_2$. where "essentially" can mean the fluid comprises at least about at least about 95% by molar concentration, at least about 96% by molar concentration, at least about 97% by molar concentration, at least about 98% by molar concentration, or at least about 99% by molar concentration $CO_2$. The working fluid immediately prior to entering the energy generating device preferably comprises substantially only $CO_2$, where "substantially only" can mean at least about 99% by molar concentration, at least about 99.5% by molar concentration, at least about 99.75% by molar concentration, or at least about 99.9% by molar concentration $CO_2$.

In one example, the presently disclosed method and system provides for net generation of electric power of about 8 megawatts when the expander/turbine 144 has a gross power generation of 20 megawatts. In one example, 12 megawatts of power are used internally to drive the air separation compressor, the $CO_2$ compressor, the syngas (H2+CO) compressor and the parasitic loads. When comparing the net energy in the natural gas fuel to the sum of the energy in the hydrogen produced and the net generation of electric power, the overall thermal efficiency of the presently disclosed method and system is typically about 50% to about 70%. In one example, the presently disclosed method and system provides about 20 megawatts of gross power output based on about 400 million BTUs per hours of energy input, where 400 million BTUs per hour equates to 117.2 megawatts, with hydrogen produced at 1.2 metric ton per hour having 40 megawatts of energy, thus, at least about 50% efficiency. In one example, the presently disclosed method provides for providing such net electric power to a direct reduction iron process, an oil-gas refinery, etc. In one example, the presently disclosed method is coupled to a process that provides a source of hydrocarbon fuel and means for CO2 sequestration, such as an oil-gas refinery, etc.

In one example, the presently disclosed method and system provides a CO2 sequestering rate of about 10 metric tons/hour, about 15 metric tons/hour, about 20 metric tons/hour, or about 25 metric tons/hour or more, based on a hydrocarbon fuel consumption of about 400 million BTU/hour. In one example, the presently disclosed method and system provides a CO2 sequestering rate of about 10 metric tons/hour, about 15 metric tons/hour, about 20 metric tons/hour, or about 25 metric tons/hour or more, based on a hydrocarbon fuel consumption of about 400 million BTU/hour and oxygen separated from air of about 15-25 short tons/hour.

In one example, the presently disclosed method and system provides a H2 production capacity of about 1 metric tons/hour, about 1.2 metric tons/hour, about 1.5 metric tons/hour, or about 2 metric tons/hour or more, based on a hydrocarbon fuel consumption of about 400 million BTU/hour.

In one example, the presently disclosed method provides clean power of about 10 megawatts, about 15 megawatts, about 20 megawatts, or about 25 megawatts or more, based on a hydrocarbon fuel consumption of about 400 million BTU/hour.

Figure 2:
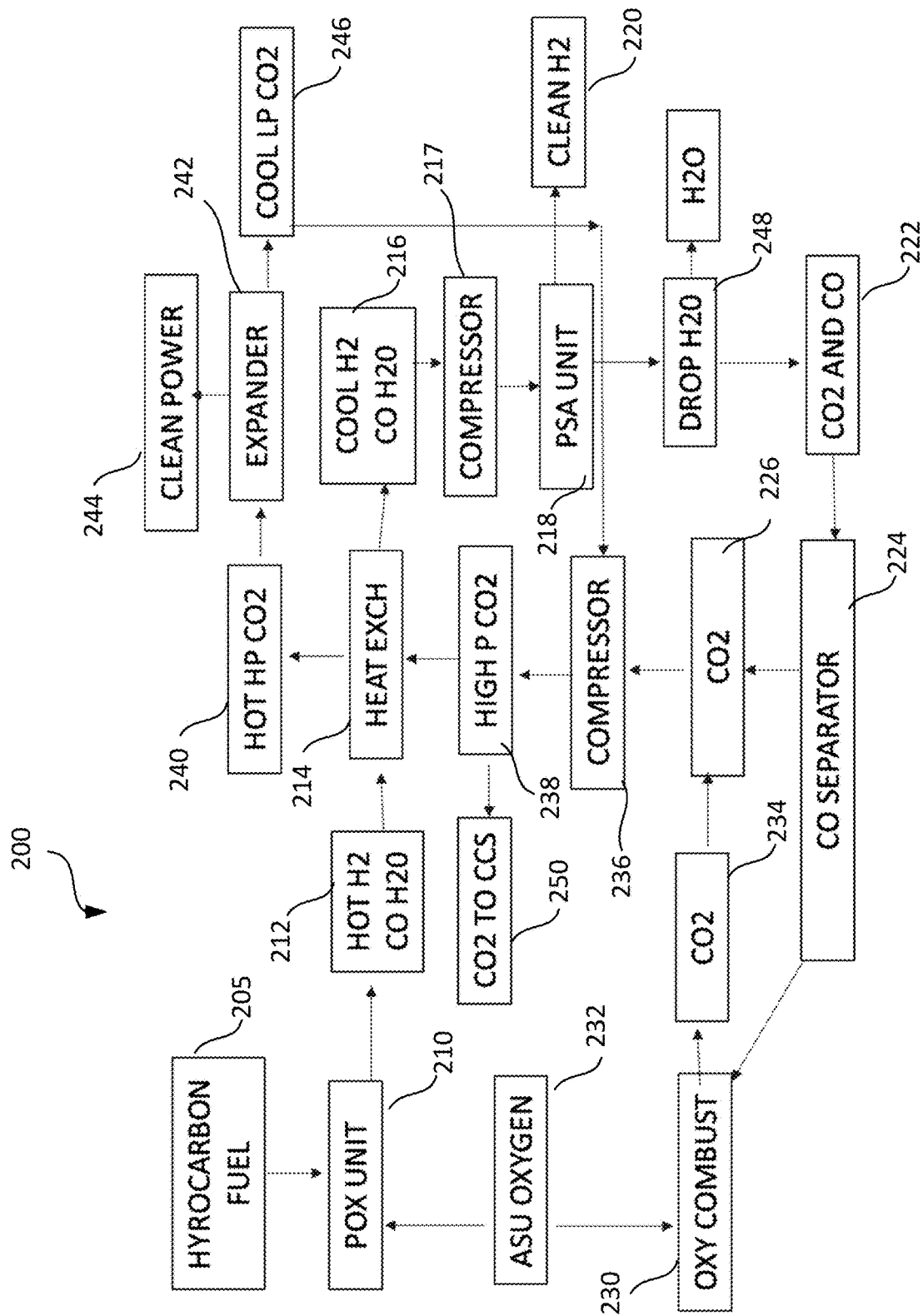
FIG. 2 is a more detailed flow diagram of the presently disclosed method and system.

With reference to the Figures, FIGS. 1 and 2 collectively schematically depict the presently disclosed method and system 100, 200 where hydrocarbon fuel 105, 205 is partially combusted in POX unit 110, 210 and provides a combustion gas stream 112, 212, the combustion gas stream comprising hydrogen and carbon monoxide (CO). The temperature of the combustion gas stream leaving the POX is between 1,000° C. and 1,600° C. and typically 1,400° C., at 2 bar g to 8 bar g (where "bar g" indicates gauge pressure).

The presently disclosed method and system uses the heat temperature of the combustion gas stream leaving the POX unit 110, 210 for heating compressed CO2 as discussed below. This heat exchange also cools the combustion gas stream 112, 212 for facilitating hydrogen separation and recovery therefrom, as discussed below.

In one example, the hydrocarbon fuel 105, 205 is natural gas, e.g., methane (CH4), or liquefied propane (LNP). In one example, the method is a configured as a partially closed loop process. In one example, the method is a configured as a closed loop process.

In one example, least partially separating the CO from the hydrogen is performed, using a first separator 218, such as a pressure swing absorption unit or cryogenic separator. In one example the combustion gas stream 112, 212 is cooled, then compressed in compressor 217 before being introduced into separator 218. The first separator can be configured to operate at 10 bar g to 30 bar g.

Exiting first separator 218 is a clean H2 stream 120, 220 that can be at least partially captured. Water 248 present in the combustion gas stream 112, 212 and exiting the first separator 218 can be removed.

Also exiting the first separator 218 is a CO/CO2 stream 222 that are unseparated by first separator 218. The CO/CO2 stream 222 can be separated in CO separator unit 124, 224. Separation of CO from CO2 can be performed in a number of ways, including, cryogenic cooling and/or distillation, selective membrane adsorption, pressure swing adsorption using porous molecular crystals (PMC), potassium carbonate solution to absorb carbon dioxide, or using high pressure water, or using hydrochloric acid or ammoniacal solutions with subsequent desorption of the separated CO from the solution using heat or vacuum. In one example, ammonia a refrigerant in a heat exchange to liquify the CO2 of the combined CO and CO2 stream, and provide for separation of the CO stream.

The presently disclosed method and system 100, 200 completely combusts at least a portion of the CO stream from CO separator unit 124, 224 in oxy-combustor 130, 230, and provides a source of carbon dioxide (CO2) working fluid 134, 234. The CO2 working fluid 234 is used to generate clean power in unit 144, 244. In one example, the O2 provided to the oxy combustor 130, 230 can be at a temperature of 30° C. to about 900° C., about 35° C. to about 800° C., about 40° C. to about 700° C., about 45° C. to about 600° C., about 50° C. to about 500° C., about 55° C. to about 400° C., about 60° C. to about 300° C., about 65° C. to about 250° C., or about 70° C. to about 200° C.

The CO2 stream 226 can optionally be compressed using compressor 236 providing high pressure CO2 238, optionally heated by introduction to at least one heat exchanger 214 to provide a hot, pressurized CO2 stream 240. In one example, a plurality of heat exchanger units, e.g., 2, 3, 4, 5, etc., are used in series.

In one example, combustion gas stream 112, 212 can provide CO2 stream 240 directly. Stream 240 is then expanded in expander unit 242 coupled to at least one clean power unit 144, 244, such as one or more turbines 114 using the CO2 as a working fluid. Lower pressure, cooled CO2 stream 246 exiting expander unit 242 can introduced to compressor 236 and recycled and/or sequestered. The temperature range of the post-expanded, low pressure cooled CO2 leaving the expander unit is between about −57° C. to about 31° C.

The source of CO2 working fluid is a liquid, a gas, in a supercritical state, or combination. In one aspect, alone or in combination with any one of the previous aspects, the method further comprises coupling the source of CO2 working to at least one turbine.

In another example, a system 200 for generating clean energy is provided, the system comprising: in a partial combustor 110, 210, partially combusting a hydrocarbon fuel and providing a combustion gas stream 112, 212 comprising an amount of hydrogen and an amount of carbon monoxide (CO) therefrom; in a oxy-combustor 130, 230, completely combusting at least a portion of the amount of CO and providing a carbon dioxide (CO2) working fluid 134, 234; and using said CO2 working fluid to generate clean power in unit 144, 244. The system can be configured to be operated as a partially closed loop or closed loop system.

The system 200 includes an air separating unit 132, 232, where the air separating unit is coupled to one or both of the partial combustor 110, 210 and oxy-combustor 130, 230 to supply oxygen thereto. Any air separation device or method can be used.

The system 200 includes a first separator unit 218, where CO in the combustion gas stream 112, 212 is at least partially separated from hydrogen. Any separator unit capable of separating CO and H2 can be used, for example, a pressure swing absorption unit. In one example the combustion gas stream 112, 212 is at least partially compressed for introduction into the first separator unit 218.

The system 200 includes a CO separator unit 124, 224 where the CO is further separated from CO2 present in the combustion gas stream 112, 212 using methods and equipment described previously. The CO exiting the CO separator unit 124, 224 is introduced to oxy-combustor 130, 230 and is oxidized into CO2 to function as working fluid 234. In one example oxy combustion unit 130, 230 attains full combustion of CO to CO2 by having an excess stoichiometric amount of oxygen relative to the CO introduced. In one example, no catalyst or other fuel is used in the oxy combustion unit 130, 230.

Separated CO2 stream 226 exiting CO separator unit 124, 224 can be joined with CO2 working fluid 234. The CO2 working fluid 234 can be provided as a liquid, gas, in a supercritical state, or combination.

The system 200 further comprises at least one compressor 236 for receiving and compressing the CO2 working fluid 234 to provide a high pressure CO2 stream 238 that is then introduced to heat exchanger 214 (coupled to the combustion gas stream 212 for heating) to provide the CO2 working fluid 234 to at least one expander unit 142, 242. The pressure of the CO2 leaving the compressor can be greater than 73.8 bar and can be as high as 1,000 bar. In one example, the pressure of the CO2 leaving the compressor is sufficient to keep the CO2 in either a liquid or a supercritical state.

Expanding the source of CO2 working fluid 134 and providing power to at least one clean power unit 244 or at least one turbine 144. In one example, at least two turbines, operated in series, are used. Cooled combustion gas stream 216 after leaving heat exchanger 214 can be introduced to first separation unit 218 and/or compressor 217. The temperature of the combustion stream leaving the heat exchanger 214 can be range of 31 C to as high as 1,500 C. In one example, the temperature of the combustion stream leaving the heat exchanger 214 can be at or above the critical temperature of CO2 so as to provide supercritical CO2.

While certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures, but may also encompass combinations of elements of the various illustrated embodiments and aspects thereof.

I claim:

1. A method for generating energy, the method comprising:
    partially combusting a hydrocarbon fuel and providing a hot combustion gas stream, the combustion gas stream comprising hydrogen (H2), carbon dioxide (CO2) water and carbon monoxide (CO);
    at least partially separating the water from the combustion gas stream and providing CO/CO2/H2 streams;
    at least partially separating the hydrogen from the combustion gas stream to provide a CO/CO2 stream and a hydrogen stream;
    at least partially separating the CO from the CO/CO2 stream and providing a CO stream;
    completely combusting at least a portion of the CO stream and providing a source of CO2 working fluid; and
    introducing said source of CO2 working fluid to at least one expander unit for receiving and expanding the source of CO2 working fluid; the at least one expander unit coupled to at least one turbine configured to generate energy.

2. The method of claim 1 wherein the method is partially closed loop or closed loop.

3. The method of claim 1, further comprising at least partially capturing the hydrogen.

4. A system for generating energy, the system comprising:
    in a partial combustor, partially combusting a hydrocarbon fuel and providing a combustion gas stream comprising an amount of hydrogen, an amount of carbon dioxide (CO2), and an amount of carbon monoxide (CO), an amount of water, therefrom;
    a first separator to separate the amount of water from the combustion gas stream and the amount of hydrogen from the combustion gas stream and provide a CO/CO2 stream and a hydrogen stream;
    a second separator configured to separate the amount of CO from the CO/CO2 stream and provide a CO stream;
    in a oxy-combustor, completely combusting at least a portion of the CO stream and providing a carbon dioxide (CO2) working fluid; and
    at least one expander unit for receiving and expanding the source of CO2; and
    at least one turbine coupled to the at least one expander unit, the at least one turbine configured to generate energy.

5. The system of claim 4, wherein the system is partially closed loop or closed loop.

6. The system of claim 4, further comprising an air separating unit, wherein the air separating unit is coupled to one or both of the partial combustor and oxy-combustor.

7. The system of claim 4, further comprising at least one carbon capture sequestration (CCS) unit coupled to the expander unit.

* * * * *